(No Model.)

C. C. JOHNSON.
BENCH DOG.

No. 300,780. Patented June 24, 1884.

WITNESSES:
C. S. Gooding.
Fred. B. Dolan.

INVENTOR:
Charles C. Johnson.
by Bowdoin S. Parker
his atty.

UNITED STATES PATENT OFFICE.

CHARLES C. JOHNSON, OF SPRINGFIELD, VERMONT, ASSIGNOR TO CHARLES E. RICHARDSON AND ADNA BROWN, BOTH OF SAME PLACE.

BENCH-DOG.

SPECIFICATION forming part of Letters Patent No. 300,780, dated June 24, 1884.

Application filed April 23, 1884. (No model.)

*To all whom it may concern:*

Be it known that I, CHARLES C. JOHNSON, of Springfield, in the county of Windsor and State of Vermont, a citizen of the United States, have invented a certain new and useful Improvement in Bench-Dogs, of which the following, with the accompanying drawings, is a specification.

Like letters of reference indicate corresponding parts.

My present invention relates to improvements in bench-dogs, in which by means of the novel arrangement of a pawl and ratchet and the connecting mechanism a more rapid and convenient adjustment of the dog is provided.

Figure 1:
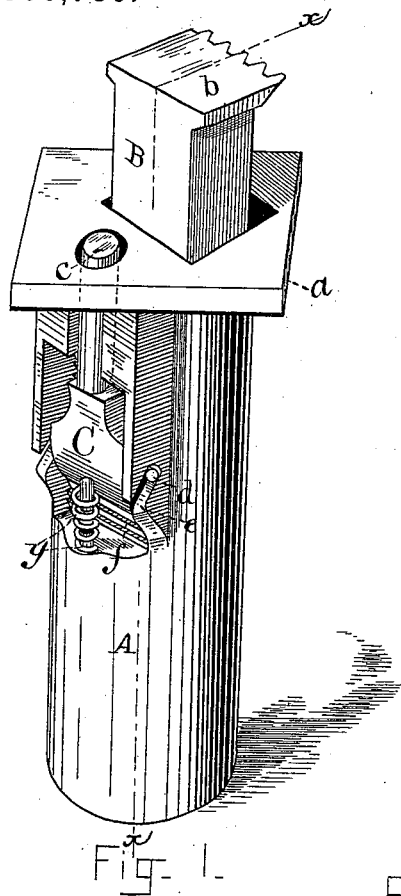
Figure 2:
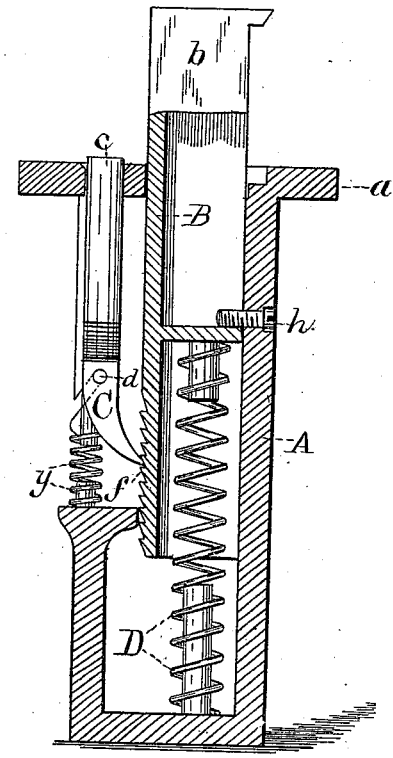
Figure 3:
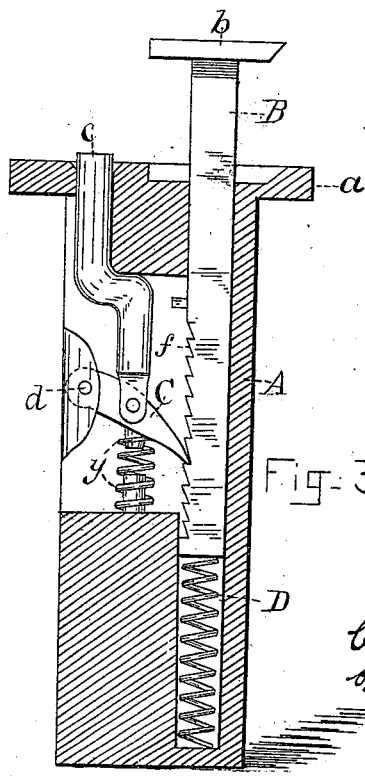

Figure 1 is an elevation in perspective. Fig. 2 is a vertical section on line $x\ x$ of Fig. 1. Fig. 3 is a vertical section representing a modification, and showing the pivot in elevation.

A is the socket, which is hollow, and is set in the top of the bench in the usual manner, the cap-piece $a$ being let into the face of the top of the bench, so that the top of the cap is flush with the surface of the bench.

B is the dog, which is provided with the head $b$. The dog, when pressed down into the socket into which it is fitted, carries the head within a recess formed in the top of the cap $a$, so that the top of the head is flush with the surface of the cap-piece and the bench. The shank of the dog is preferably made partially hollow, as shown in Fig. 2, although this is not essential. Inside the socket and resting upon its bottom is a spring, D, upon the top of which rests the lower end of the shank of the dog. Upon the vertical surface of the back of the dog-shank is formed a series of ratchet-teeth, $f$, and immediately behind it is placed a pawl, C, the lower end of which is adapted to engage with the teeth or ratchet upon the dog-shank. The spring $y$ retains the pawl or latch in position. The top of the pawl terminates with the stem $c$, the top of which extends through an orifice in the cap-piece and terminates flush with the surface of same. Upon each side of the pawl is formed an arm or pin, $d$, which enters the inclined slot $e$ formed in the socket-shell.

The mode of operation is as follows: The dog-shank, being placed in the socket, is pressed down to any desired position, and is held firmly in place by the pawl operating with the ratchet-teeth. Now, by pressing upon the stem $c$, the pawl is released and the spring within the socket and under the dog instantly forces it upward to any desired height. By this construction it will be observed that I obtain a rapid adjustment, and the dog is held in any desired elevation positively. The dog can be depressed to the surface of the bench without touching any part of the holding mechanism—that is, whenever anything is thrown upon the dog-head, or when pressed upon in any manner, it instantly falls to the surface of the bench where it is held till released by the withdrawal of the pawl from the ratchet teeth. The dog is operated entirely from above the surface of the bench and without the aid of tools or complicated mechanical appliances. When the dog-shank is made hollow, I form a projection or stop in or near the bottom, upon which the spring presses to raise the dog. A screw may be inserted through the side of the hollow socket, to prevent the dog from being elevated too high or from being thrown out of the top by the action of the spring. The screw is shown in Fig. 2, $h$.

In Fig. 3, I represent a modification of my device, which may be employed, if desired, and which consists in making the pawl as shown, Fig. 3, C; but instead of having the pins $d\ d$ move in the slots formed in the socket-shell the pins are journaled in the shell in such a manner that the point of the pawl may be pushed downward to release it from the ratchet by means of the lever or arm $c$, which may or may not be attached to the pawl. The spring $y$ is used to hold the pawl against the ratchet. It would be possible to arrange the pawl so that it would fall by gravity to its place against the ratchet, thus doing away with the spring $y$, and other forms of pawl and stem or lever $c$ could be used without departing from the spirit of my invention. It is also immaterial which side of the dog-shank the ratchet-teeth are formed on, or whether engaged by a pawl, finger, cam, or spring, so long as the principal and essential combination herein-described is retained.

I am aware that a spring has been used within a hollow socket to raise and support a dog-shank and its head vertically; but this I do not claim.

I am also aware that a ratchet and latch have been employed in certain combinations in a bench-dog. Therefore I do not claim either, except in the combination which forms the spirit of my invention.

Having now fully described my invention, what I claim, and desire to secure by Letters Patent of the United States, is—

1. The bench-dog herein described, consisting of the hollow socket A, provided with the cap-piece $a$, and the dog-head and shank $b$ B, fitted to said socket and resting upon spring D, and adapted to be depressed by pressure upon the head $b$, irrespective of other mechanism, and provided with suitable means for automatically holding the dog-head and shank in the socket when depressed, all combined substantially as and for the purposes set forth.

2. The combination, in a bench-dog, provided with a socket and cap-piece, of a pawl arranged to be depressed by means of a stem or bar extending through said cap-piece, the said pawl having projections upon each side adapted to move in slots formed in said socket, and a spring arranged to support said pawl in a backward and downward movement in said slots, substantially as and for the purposes set forth.

3. The combination of the socket A, provided with slots $e$, the dog B, provided with head $b$, and a shank having ratchet-teeth upon its side, the spring D, pawl C, provided with stem $c$, and projections $d$, and spring $y$, the said pawl being adapted to move downward and away from the ratchet guided by the projections $d$ moving in slots $e$, and to be returned by means of the spring $y$, substantially as and for the purposes set forth.

4. In a bench-dog, the combination of the ratchet $f$, pawl C, and spring $y$, the point of said pawl being arranged to operate in connection with said ratchet, and to hold the dog-shank and its head at any stage of its depression in the socket automatically, and adapted to be disengaged by a downward pressure upon the stem $c$, and to allow the dog-shank and head to automatically, and by a single disconnection, assume their highest elevation in the socket, all substantially as and for the purposes set forth.

CHARLES C. JOHNSON.

In presence of—
    JUSTUS DARTT,
    A. M. ALLBE.